UNITED STATES PATENT OFFICE.

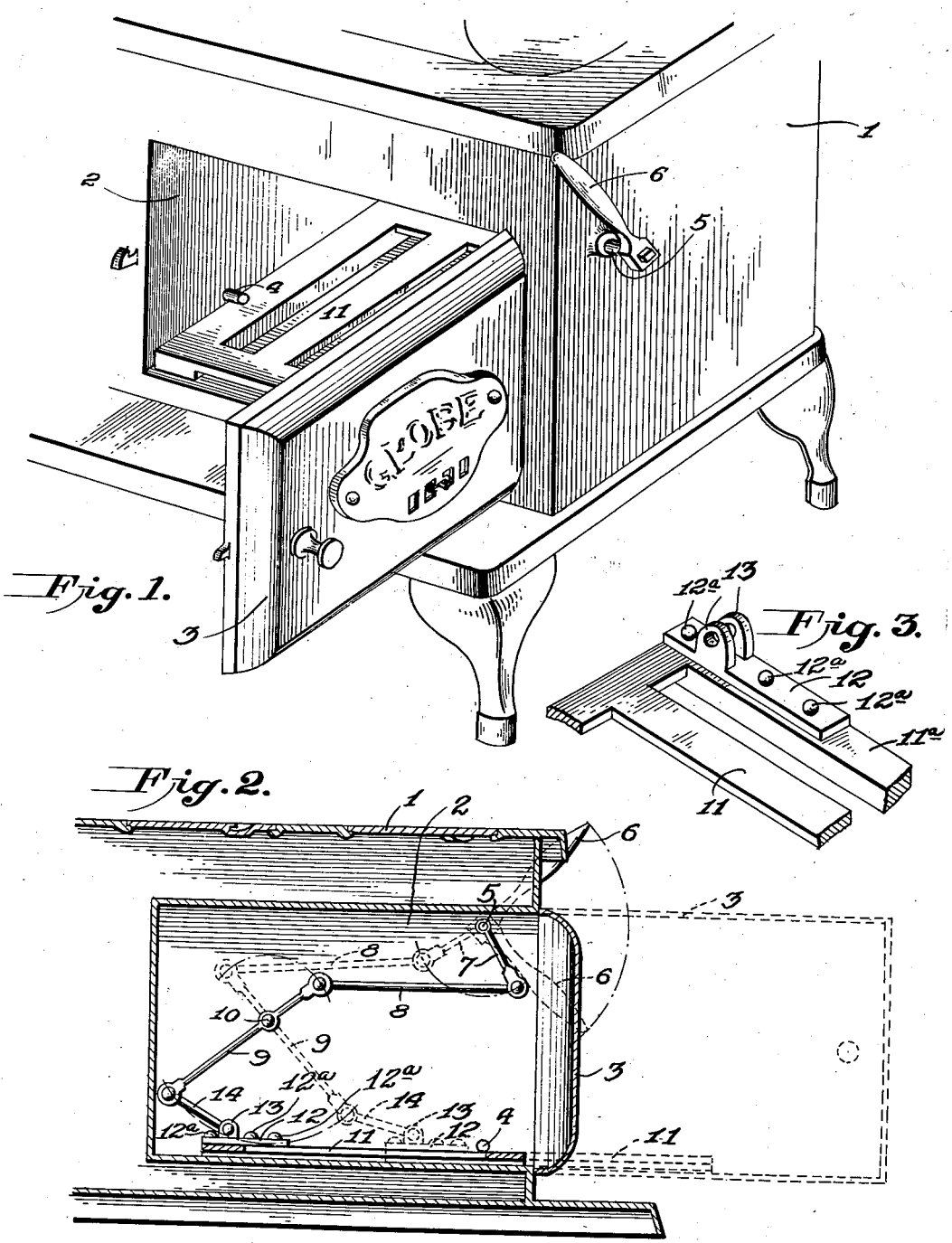

BOSLERY WILLIAM CLARK, OF BROWN STATION, NEW YORK.

STOVE ATTACHMENT.

969,340.  Specification of Letters Patent.  Patented Sept. 6, 1910.

Application filed March 5, 1910. Serial No. 547,587.

*To all whom it may concern:*

Be it known that I, BOSLERY WILLIAM CLARK, a citizen of the United States of America, residing at Brown Station, in the county of Ulster and State of New York, have invented certain new and useful Improvements in Stove Attachments, of which the following is a specification, reference being had therein to the accompanying drawing.

This invention relates to cooking stoves, and the principal object of the same is to provide an attachment for the oven that forms a support for cooking utensils and which is slidably mounted in the oven so that it may be projected beyond the oven to permit access being had to the cooking utensils thereon, thereby obviating the danger of the attendant becoming injured from contact with the stove.

In carrying out the objects of the invention generally stated above it will be understood, of course, that the essential features thereof are necessarily susceptible of changes in details and structural arrangements, one preferred and practical embodiment of which is shown in the accompanying drawings, wherein.—

Figure 1 is a fragmentary perspective view of a cooking stove, the oven door thereof being opened to expose the oven attachment. Fig. 2 is a central vertical sectional view thereof, the door being shown closed. Fig. 3 is a fragmentary detail perspective view of the oven attachment.

Referring to said drawing by numerals, 1 designates a cooking stove, the oven 2 of which is equipped with the usual door 3 and the side walls of which are equipped with guide rollers 4, said rollers 4 being preferably arranged adjacent the bottom of the oven.

A rocker shaft 5 extends through the outer wall of the oven 1, said shaft being preferably arranged adjacent the upper forward corner thereof, and having its projecting outer end equipped with a handle 6. The inner end of shaft 5 has a crank arm 7 thereon that is pivotally connected to one end of a link rod 8, the other end of said rod being pivotally connected to one end of a lever 9 that is pivotally mounted on a stub shaft 10 projecting from the inner surface of the outer wall of the oven.

The improved oven attachment is in the form of a flat grate 11 that is of slightly less size than the bottom of the oven so that it may be inclosed in the oven when the door 3 is closed, as shown in Fig. 2. The grate is fitted within the oven beneath the guide rollers 4, and the rear end portion of one of its side bars has a plate 12 riveted or otherwise fastened on its upper surface. Said plate is provided with a pair of spaced apart upstanding pivot ears 13 between which one end of a link bar 14 is pivotally mounted the other end of said link bar 14 being pivotally connected to lever 9.

In Fig. 2, dotted lines have been used to indicate the manner of projecting the grate 11 from the oven 1, and by reference thereto it will be observed that by opening door 3 and then rocking handle 6 in one direction, the crank and link connection 7—8 between shaft 5 and lever 9 will rock said lever so that link 14 will push grate 11 to cause its forward portion to project from oven 1 and thereby permit access to be had to the utensils or other articles supported by said grate. A reversal of the described operation will withdraw the grate into the oven.

It will be obvious, that the guide rollers 4 in addition to facilitating the placing in or the withdrawal of the grate, also prevent tilting of the same when in a projecting position, and that the length of lever 9 is such that the outward movement of the grate is limited to prevent its rear end passing forward of the guide rollers 4.

What I claim as my invention is:—

A device of the character described comprising a grate adapted to be slidably mounted in an oven, a link pivotally connected to said grate, a lever adapted to be pivotally connected to a wall of an oven and having one end pivotally connected to said link, a shaft projecting from a wall of the oven, a crank carried by the inner end thereof, a pivotal link connection between said crank and said lever, and a handle carried by the outer external end of said shaft for operating said lever and links to cause them to project the grate from or draw the same into said oven.

In testimony whereof I hereunto affix my signature in presence of two witnesses.

BOSLERY WILLIAM CLARK.

Witnesses:
E. V. GATHRIGHT,
FRED K. BETTS, Jr.